United States Patent [19]

Kusmer

[11] Patent Number: 5,027,307

[45] Date of Patent: Jun. 25, 1991

[54] LIGHTING APPLICATION CALCULATOR

[75] Inventor: Raymond J. Kusmer, La Habra, Calif.

[73] Assignee: Cooper Industries, Inc., Houston, Tex.

[21] Appl. No.: 526,778

[22] Filed: May 17, 1990

Related U.S. Application Data

[63] Continuation of Ser. No. 175,824, Mar. 31, 1988, abandoned.

[51] Int. Cl.$^5$ .......................... G06F 3/00; G09B 25/00
[52] U.S. Cl. ............................... 364/709.02; 235/61 R; 434/72
[58] Field of Search ...................... 364/709.01, 709.02, 364/711.01, 711.02, 715.01, 512, 550, 525; 235/61 A, 61 R, 70 A, 70 R, 78 R, 78 M, 85 R, 88 R, 88 M; 434/72

[56] References Cited

U.S. PATENT DOCUMENTS

| | | | |
|---|---|---|---|
| 2,328,456 | 8/1943 | Humphreys | 434/72 |
| 2,517,590 | 8/1950 | Mundroff | 235/85 R |
| 4,772,780 | 9/1988 | Reed et al. | 235/70 A |

OTHER PUBLICATIONS

Phillips, *Lighting in Architectural Design*, pp. 267-284, McGraw-Hill Book Co., New York, 1964.

*Primary Examiner*—Dale M. Shaw
*Attorney, Agent, or Firm*—Michael F. Heim; Elliott Cox; Alan Thiele

[57] ABSTRACT

An apparatus for selecting optimum lighting fixtures for a given application first determines a room cavity ratio from entered values of the dimensions of the room. The room cavity ratio is used to select from tabulated values a coefficient of utilization. The light output in lumens from a particular lamp, modified as necessary by depreciation factors, is applied to determine the number of fixtures and the spacing of those fixtures that are necessary to achieve a desired level of illumination. The design process then normally requires changing the number of fixtures to an integral number that lends itself to the space to be illuminated. Reentry of such values as well as different values of illumination levels that are associated with different fixtures allows repeated determinations to optimize the selection of a lighting fixture. A portable calculator that is modified to allow entry of the data described above, the calculation of the number and spacing of lighting units, and recalculation based upon differing inputs, provides a ready solution to the problem of selecting lighting fixtures.

5 Claims, 9 Drawing Sheets

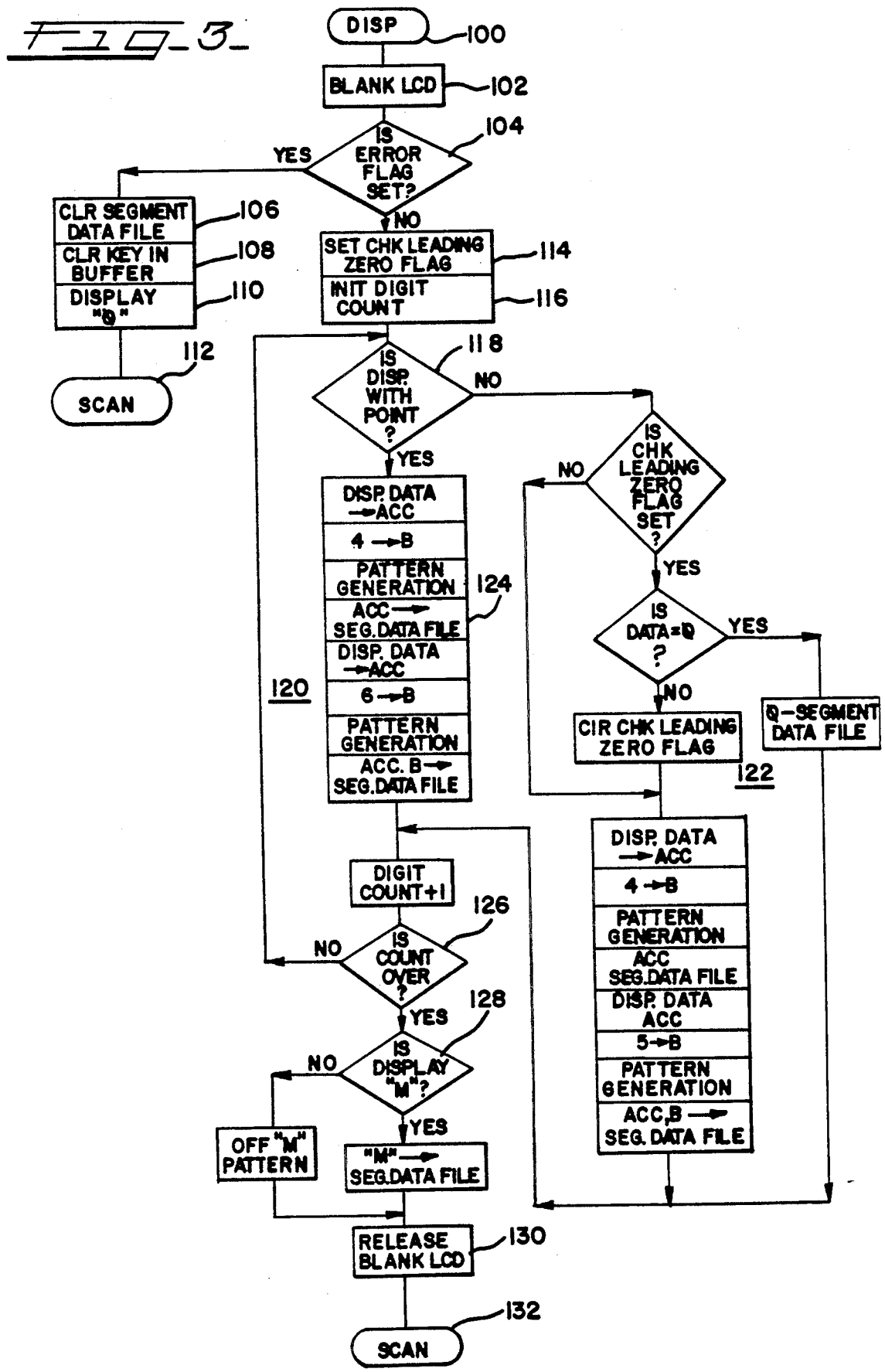
FIG_3

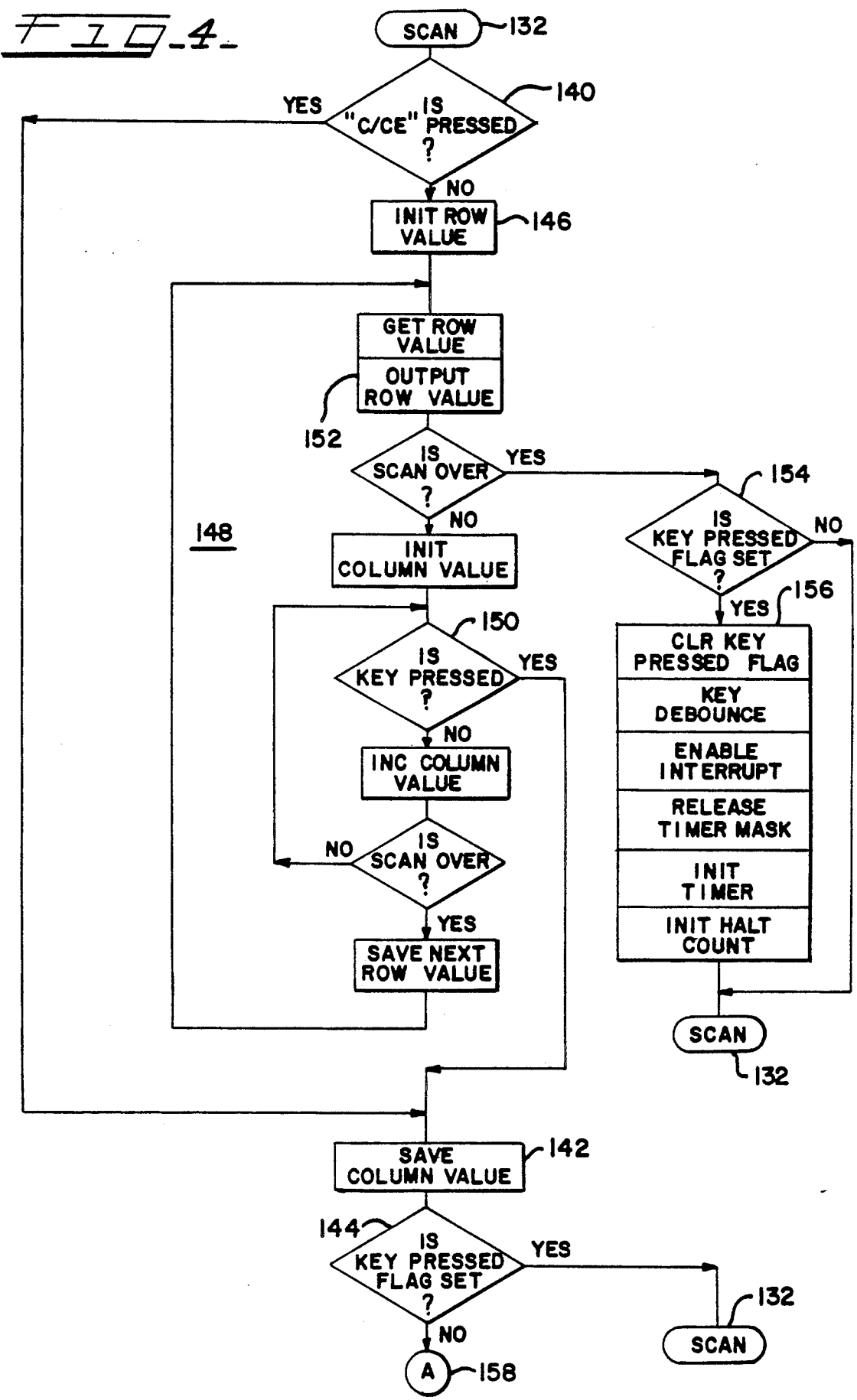

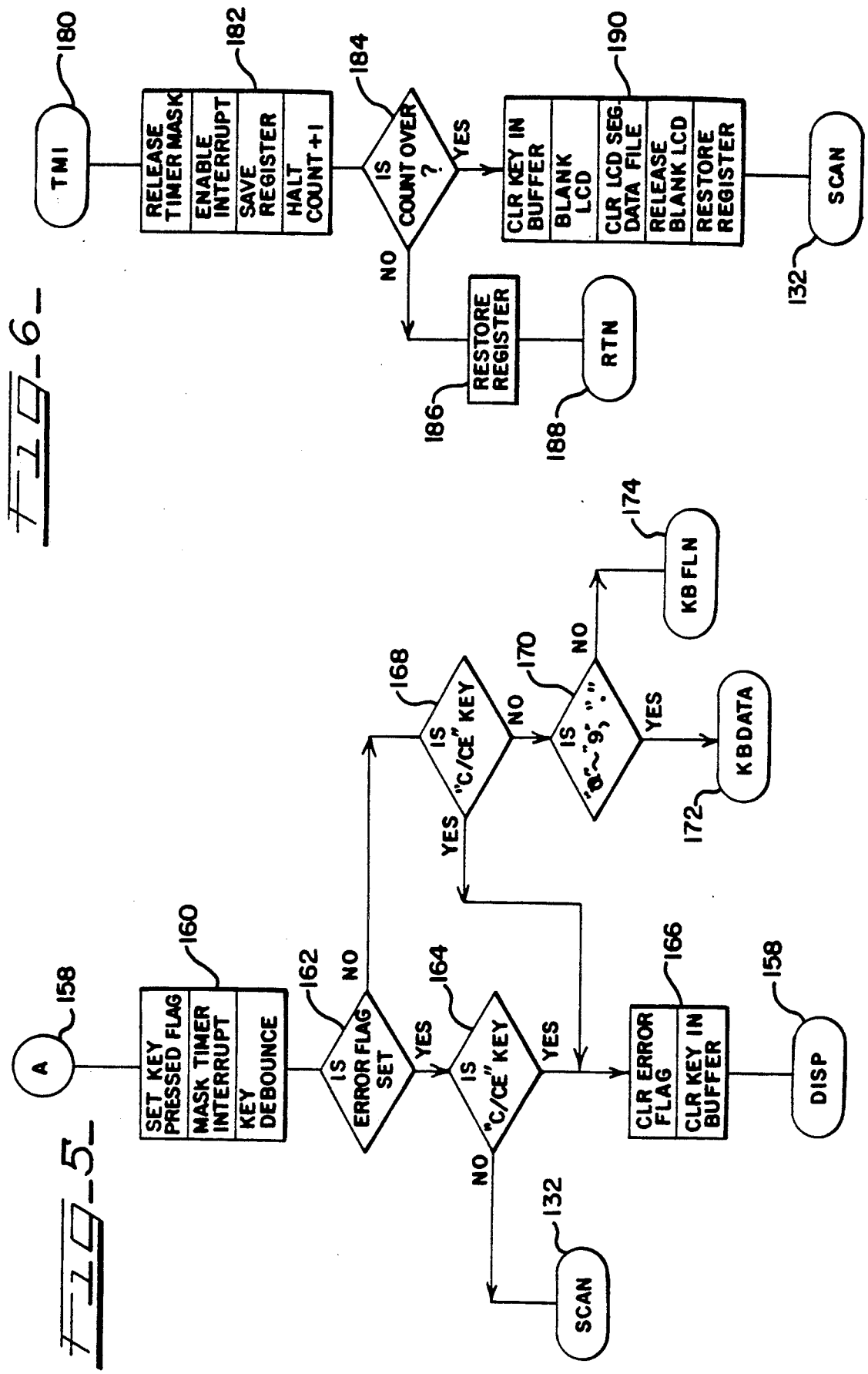

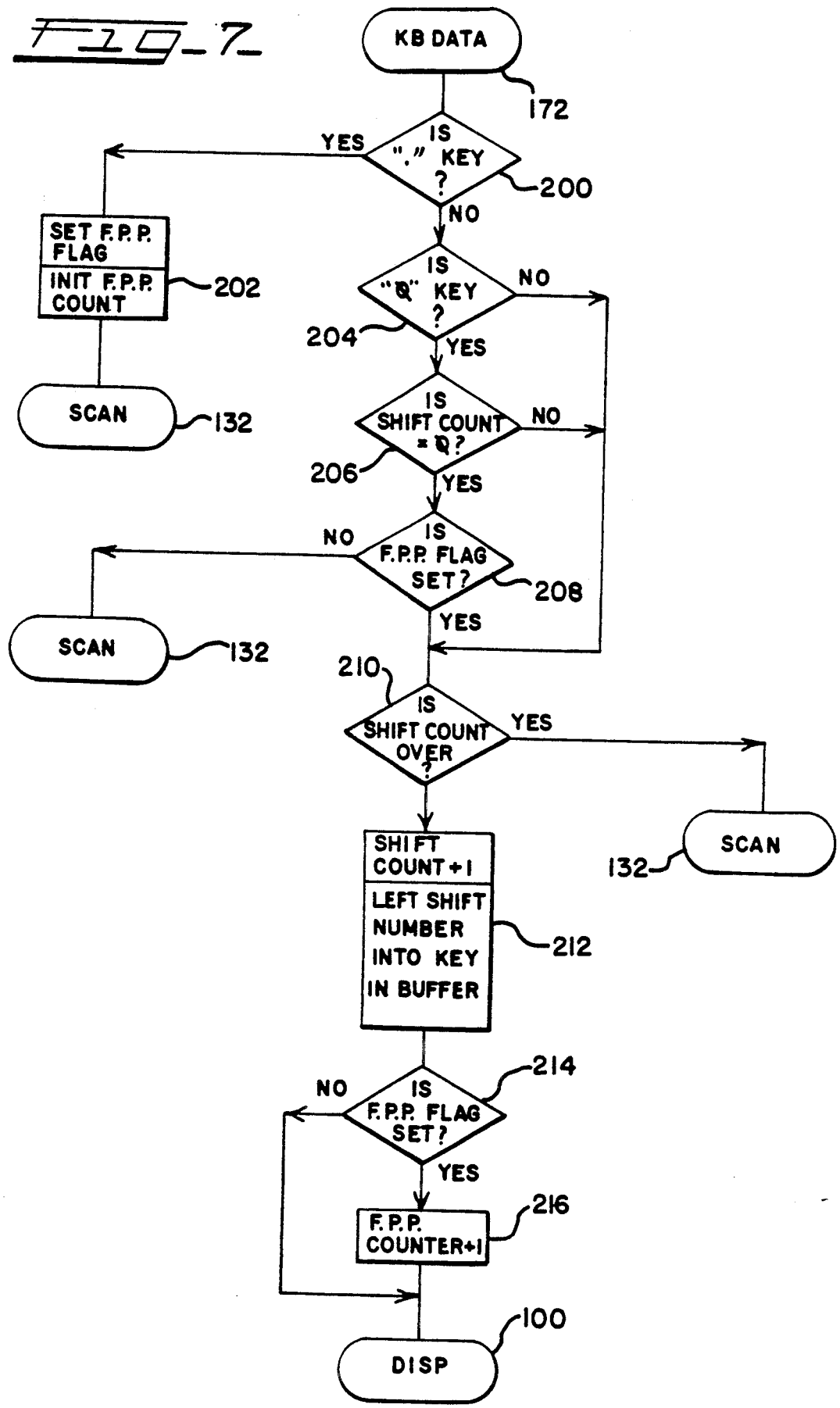

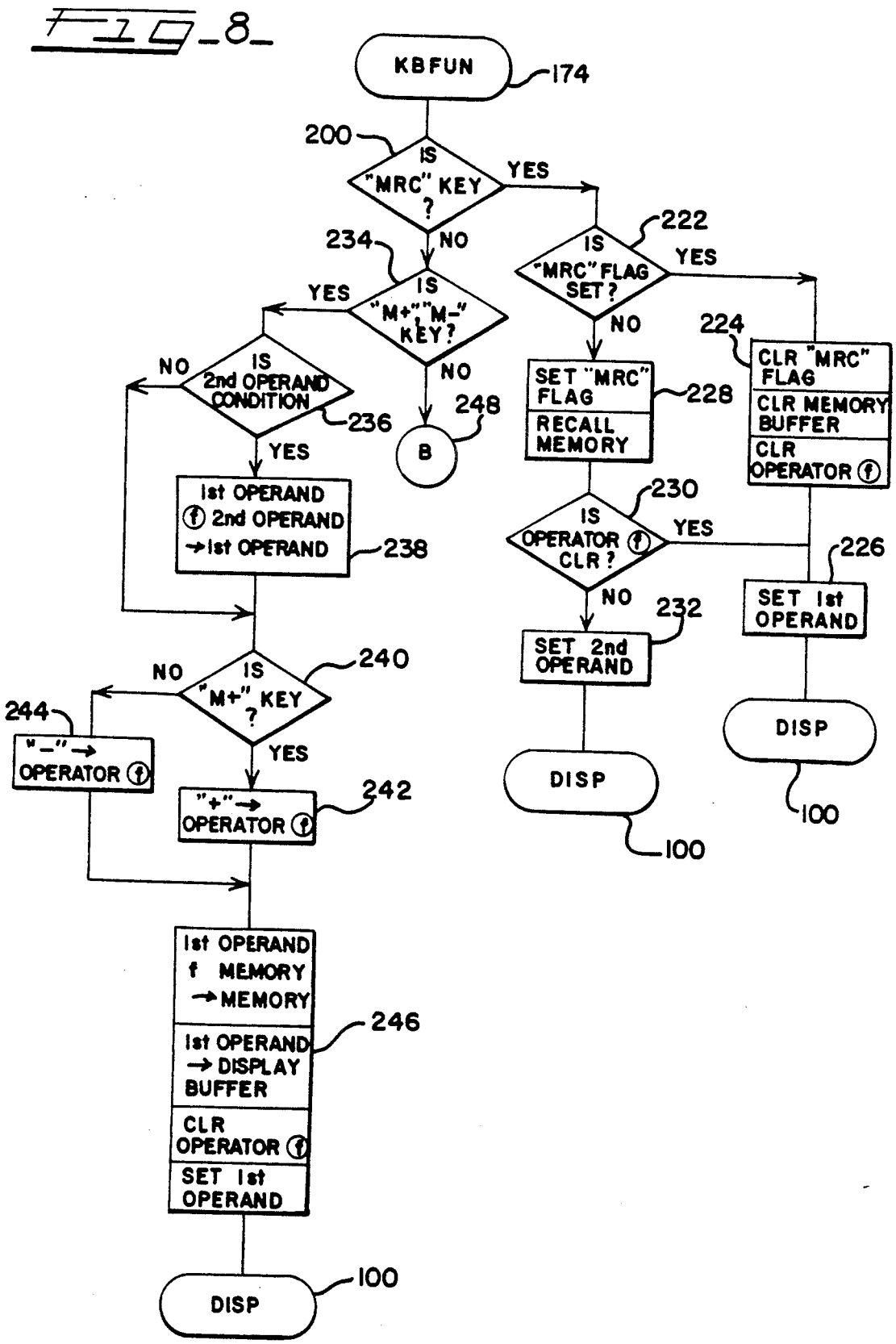

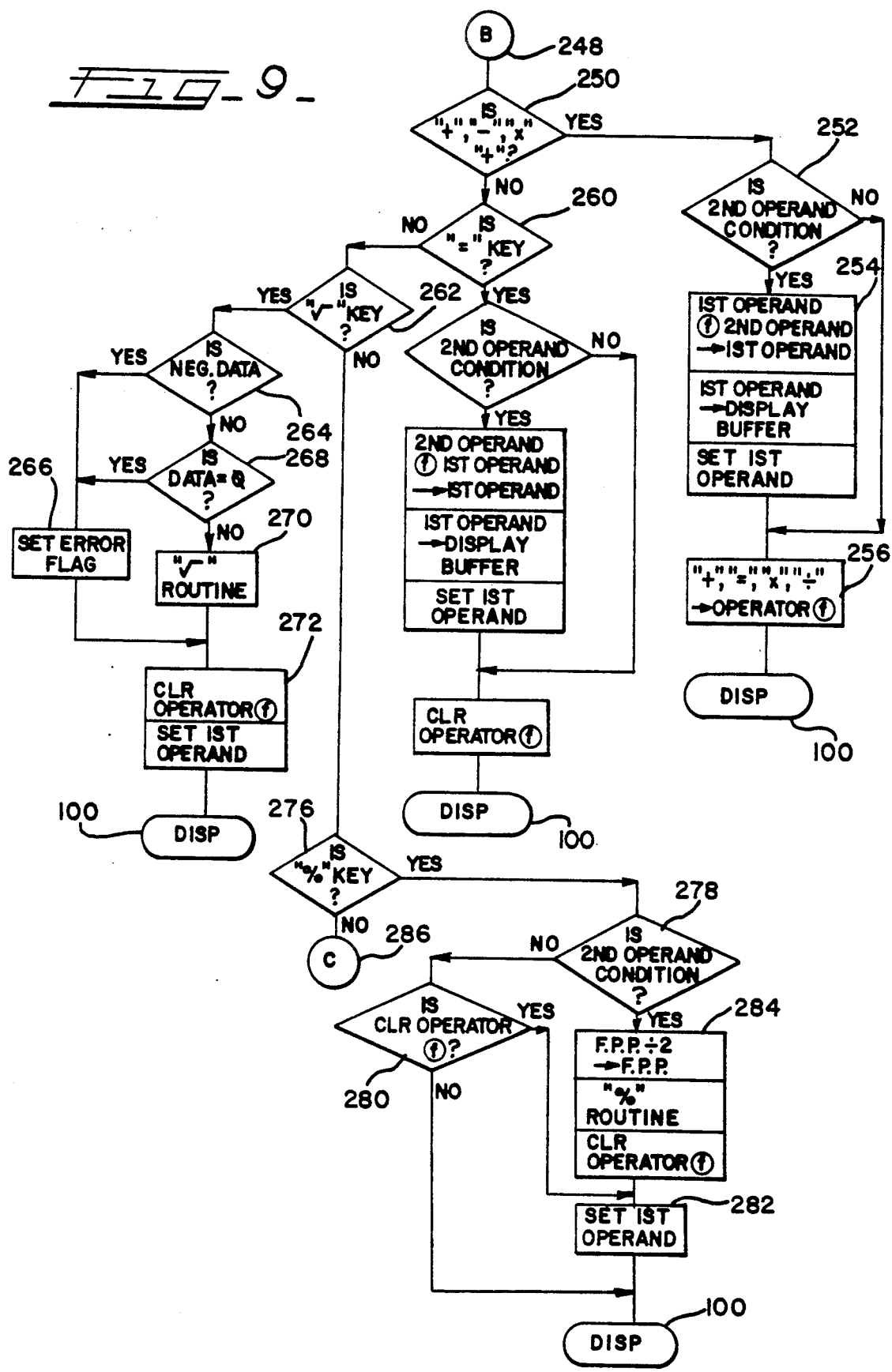

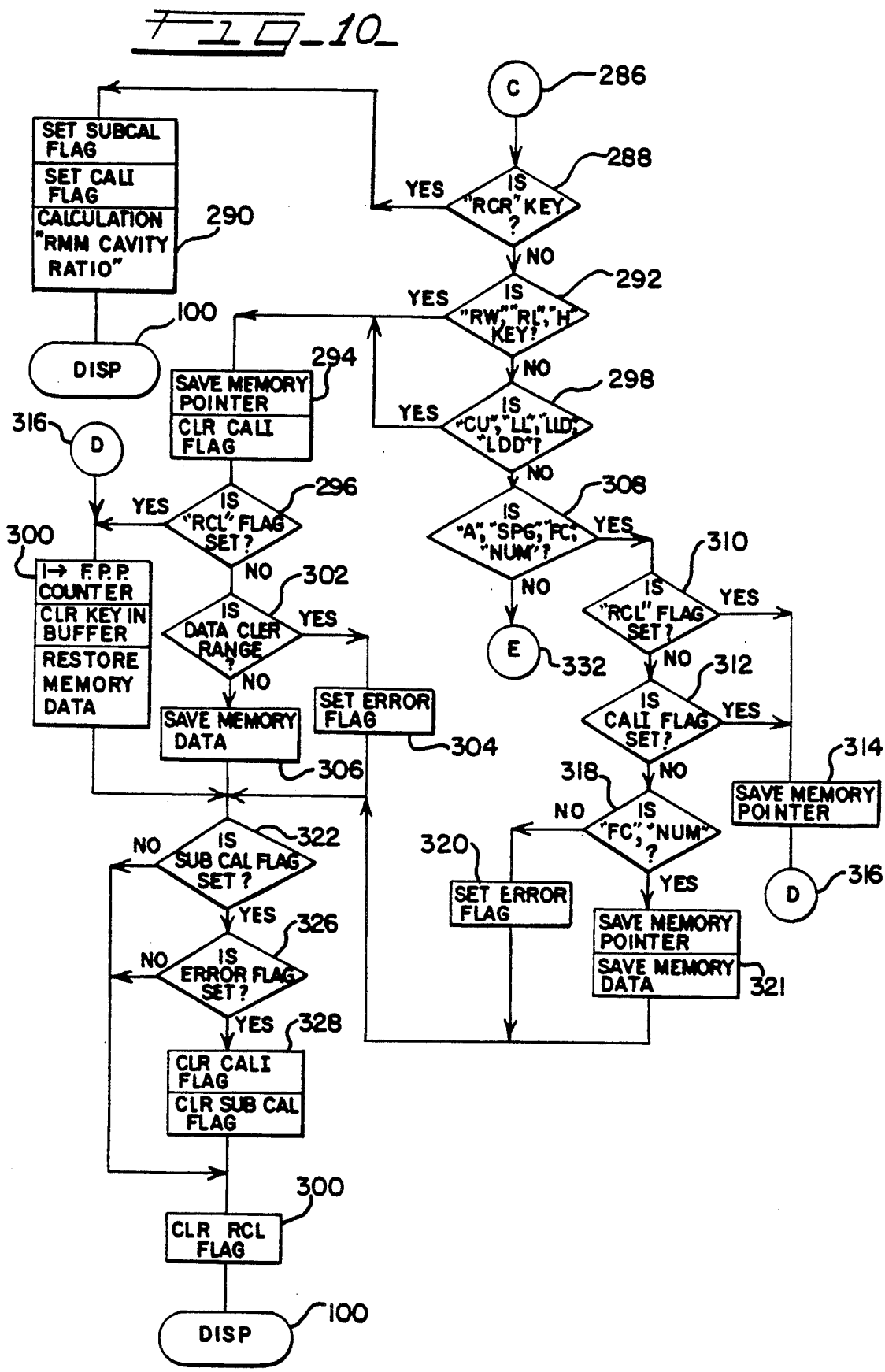

LIGHTING APPLICATION CALCULATOR

This is a continuation of copending application Ser. No. 07/175,824 filed on Mar. 31, 1988 now abandoned.

BACKGROUND OF THE INVENTION

This invention relates to an apparatus for the selection of lighting fixtures. In particular, it is an improved means of determining the number of fixtures necessary to provide a predetermined level of illumination in a given space.

The selection of lighting fixtures for use in a given space involves certain calculations, certain assumptions, and the application of tabulated information. The dimensions of a room to be illuminated and their ratio to each other affect the selection of lighting fixtures. The function to be performed in a given space normally determines the required lighting level in footcandles. Tabulations exist of recommended illumination values in footcandles for different activities. The amount of light produced by various combinations of light sources and reflectors can be measured and tabulated. These figures can be modified by taking into account anticipated decreases in light output from such fixtures as a function of time and as a function of the average cleanliness of the fixtures.

The process of selecting a recommended pattern of lights to meet various specifications becomes one of calculating the number of lights required and their spacing from each other based upon an input of the parameters described above. The purchase cost of a lighting system for a space is a function of the type of unit that is used and the number of units required. Selection of the lighting units to be used for particular installation thus requires a number of calculations and the use of various tabulated descriptive factors. For major new construction, the decision as to which lighting units to select is often made by entering parameters in a mainframe computer that is programmed to calculate and print out the results of selecting various options. A manufacturer of lighting elements, for example, can typically devote time from a main-frame computer to carry out such calculations for customers.

In contrast, a dealer, distributor or lighting contractor may not have a main-frame computer available to be programmed for the solution of lighting problems, or may not have enough lighting problems to solve to make it worth the effort of programming such a computer. The dealer or distributor is therefore forced either to resort to repeated calculations by pencil and paper to reach approximate solutions, or to refer such questions to the manufacturer for solution. The first of these approaches is relatively expensive and inefficient, while the second approach takes time to get back answers. It would be useful to have a method and means of determining the solution to lighting problems at or near a job site with a relatively inexpensive apparatus.

SUMMARY OF THE INVENTION

It is an object of the present invention to provide a better way of determining the solution to lighting problems.

It is a further object of the present invention to provide a method and means of determining the number and spacing of lighting fixtures for a given light level and set of room dimensions.

It is a further object of the present invention to provide a portable and inexpensive apparatus for determining the selection of lighting fixtures.

It is a further object of the present invention to provide an inexpensive and portable apparatus applying room dimensions, parameters of lighting units, and tabulated information to determine a recommended number and spacing of lighting fixtures for a given application.

It is a further object of the present invention to provide an apparatus for determining the number and spacing of lighting fixtures for a given application that can be operated to determine the effects of varying certain of the parameters.

Other objects will become apparent in the course of a detailed description of the invention.

An apparatus for selecting optimum lighting fixtures for a given application first determines a room cavity ratio from entered values of the dimensions of the room. The room cavity ratio is used to select from tabulated values a coefficient of utilization. The light output in lumens from a particular lamp, modified as necessary by depreciation factors, is applied to determine the number of fixtures and the spacing of those fixtures that are necessary to achieve a desired level of illumination. The design process then normally requires changing the number of fixtures to an integral number that lends itself to the space to be illuminated. Reentry of such values as well as different values of illumination levels that are associated with different fixtures allows repeated determinations to optimize the selection of a lighting fixture. A portable calculator that is modified to allow entry of the data described above, the calculation of the number and spacing of lighting units, and recalculation based upon differing inputs, provides a ready solution to the problem of selecting lighting fixtures.

BRIEF DESCRIPTION OF THE DRAWINGS

FIG. 3 is a flow chart of a display routine for the practice of the present invention.

FIG. 4 is a flow chart of a keyboard scan routine for the practice of the present invention.

FIG. 5 is a continuation of the flow chart of the keyboard scan routine of the FIG. 4.

FIG. 6 is a flow chart of a timer interrupt routine.

FIG. 7 is a flow chart operation in response to keyboard data input.

FIG. 8 is a flow chart of operation in response to keyboard function input.

FIG. 9 is a continuation of the flow chart of FIG. 8.

FIG. 10 is a continuation of the flow chart of FIG. 9.

DETAILED DESCRIPTION OF THE INVENTION

Figure 1:
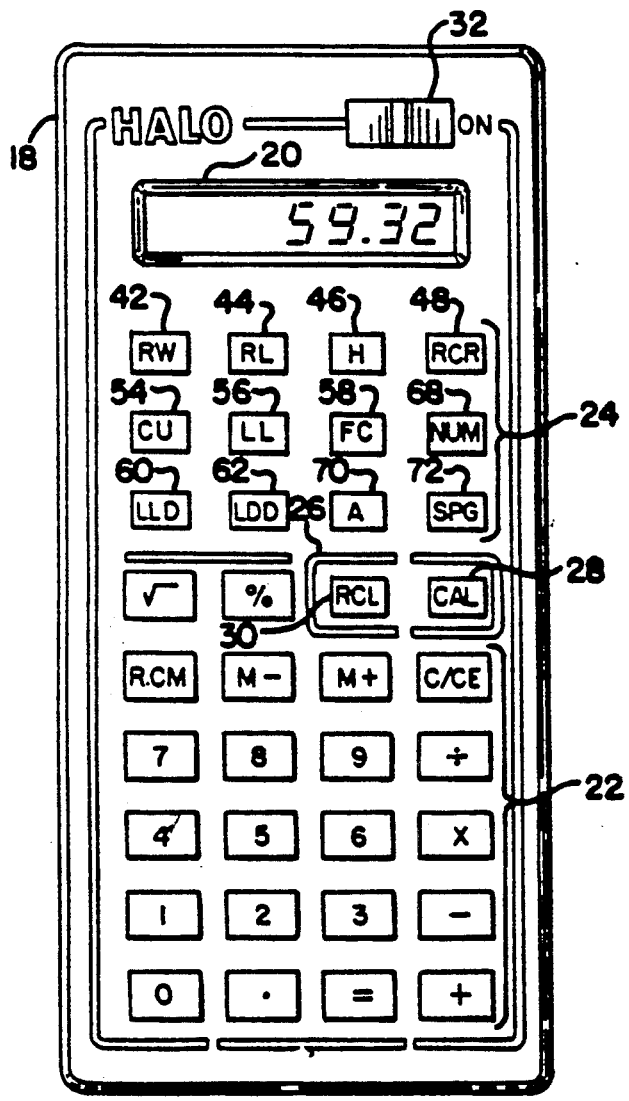
FIG. 1 is a view of a portable calculator for the practice of the present invention.

FIG. 1 is a front view of a calculator 18 that has been constructed for the practice of the present invention. In FIG. 1, a display 20 and a calculator keyboard 22 represent a typical four-function calculator. A region 24 contains a plurality of keys for the entry and recall of information that is pertinent to the calculation of lighting parameters. A region 26 includes a key 28 that directs the calculation of lighting parameters and a key 30 that directs the recall of entered or calculated information. A switch 32 turns on the calculator 18 for use either as a four-function calculator or as a dedicated instrument for determining lighting parameters.

Operation of the calculator 18 for the determination of lighting parameters proceeds as follows. The numbers corresponding to the room length and width in feet are entered on the appropriate push buttons on the calculator keyboard 22. Each such number as entered appears on the display 20. The room width is entered for calculation by depressing the RW button 42. This resets the calculator keyboard 22 for entry of a number corresponding to the room length. When this number is entered and displayed, the RL button 44 enters the room length. The room height is similarly entered on the calculator keyboard 22 and is entered for calculation by depressing the H button 46. The calculator 18 will then determine and display the room cavity ratio (RCR) as shown in Table 1 when the RCR button 48 is depressed.

TABLE 1

Definitions and Calculated Quantities

1. Definitions
   - RL = Room length in feet
   - RW = Room width in feet
   - h = Room height in feet
   - RCR = Room cavity ratio
   - NUM = Number of Fixtures
   - LL = Lamp lumen rating
   - LLD = Lamp lumen depreciation
   - LDD = Luminaire dirt depreciation
   - FC = Footcandles at work plane
   - CU = Coefficient of Utilization
   - A = Area per fixture
   - Spg = Spacing of fixtures 2. Formulas relating quantities $$RCR = \frac{5 h (RL + RW)}{RL \times RW}$$

$$NUM = \frac{FC \times RL \times RW}{LL \times LLD \times LDD \times CU}$$

$$FC = \frac{NUM \times LL \times LLD \times LDD \times CU}{RL \times RW}$$

$$A = \frac{LL \times LLD \times LDD \times CU}{FC}$$

$$SPG = \sqrt{A}$$

The preceding entries have been based implicitly on the assumption of a space having a rectangular floor plan and a uniform height. Spaces which do not meet these criteria may either be divided for design into rectangular spaces of uniform height, or may be treated by means of approximations to the dimensions.

The lighting designer will normally select a particular fixture for trial in a design. Such a fixture will have tabulated coefficient of utilization (CU), a number between 0 and 1. The tabulated value for a particular fixture is entered in the calculator keyboard 22, and is entered for calculation by depressing the CU button 54. The light output of the lamp is also tabulated as a lumen rating that is entered on the calculator keyboard 22, and is entered for calculation by depressing the LL button 56. A sample listing of coefficients of utilization for various reflectances as a function of RCR for a particular fixture is given in Table 2.

| Ceiling Reflectance in percent | | |
|---|---|---|
| 80 | 70 | 50 |
| Wall Reflectance in percent | | | | | | | | |
| 50 | 30 | 10 | 50 | 30 | 10 | 50 | 30 | 10 |
| RCR | | | | | | | | |
| 1  0.54 | 0.54 | 0.53 | 0.53 | 0.53 | 0.52 | 0.51 | 0.51 | 0.51 |
| 2  0.52 | 0.51 | 0.50 | 0.52 | 0.51 | 0.50 | 0.50 | 0.49 | 0.49 |
| 3  0.51 | 0.50 | 0.49 | 0.50 | 0.49 | 0.48 | 0.49 | 0.48 | 0.47 |
| 4  0.50 | 0.48 | 0.47 | 0.49 | 0.48 | 0.47 | 0.48 | 0.47 | 0.46 |
| 5  0.49 | 0.47 | 0.46 | 0.48 | 0.47 | 0.46 | 0.47 | 0.46 | 0.45 |
| 6  0.48 | 0.46 | 0.45 | 0.47 | 0.46 | 0.45 | 0.47 | 0.46 | 0.45 |
| 7  0.47 | 0.45 | 0.44 | 0.46 | 0.45 | 0.44 | 0.46 | 0.45 | 0.44 |
| 8  0.46 | 0.45 | 0.44 | 0.46 | 0.44 | 0.43 | 0.45 | 0.44 | 0.43 |
| 9  0.45 | 0.44 | 0.43 | 0.45 | 0.44 | 0.43 | 0.45 | 0.44 | 0.43 |
| 10  0.45 | 0.43 | 0.42 | 0.44 | 0.43 | 0.42 | 0.44 | 0.43 | 0.42 |

| Ceiling Reflectance in percent | | |
|---|---|---|
| 30 | 10 | 0 |
| Wall Reflectance in percent | | | | | |
| 50 | 30 | 10 | 50 | 30 | 10 | 0 |
| RCR | | | | | | |
| 1  0.50 | 0.49 | 0.49 | 0.48 | 0.48 | 0.48 | 0.47 |
| 2  0.49 | 0.48 | 0.48 | 0.48 | 0.47 | 0.47 | 0.46 |
| 3  0.48 | 0.47 | 0.47 | 0.47 | 0.47 | 0.46 | 0.46 |
| 4  0.47 | 0.47 | 0.46 | 0.47 | 0.46 | 0.45 | 0.45 |
| 5  0.47 | 0.46 | 0.45 | 0.46 | 0.45 | 0.45 | 0.44 |
| 6  0.46 | 0.45 | 0.44 | 0.46 | 0.45 | 0.44 | 0.44 |
| 7  0.46 | 0.45 | 0.44 | 0.45 | 0.44 | 0.44 | 0.43 |
| 8  0.45 | 0.44 | 0.43 | 0.45 | 0.44 | 0.43 | 0.43 |
| 9  0.44 | 0.43 | 0.43 | 0.44 | 0.43 | 0.43 | 0.42 |
| 10  0.44 | 0.43 | 0.42 | 0.44 | 0.43 | 0.42 | 0.42 |

The nature of the work space being illuminated determines the footcandle rating which is entered on the calculator keyboard 22 and is entered for calculation by depressing the FC button 58. Two depreciation factors are determined by the luminaire selected and by the atmosphere in the room. The lamp lumen depreciation (LLD) is a number between 0 and 0.99 that is entered on the calculator keyboard 22 and entered for calculation by depressing the LLD button 60. The LLD represents the reduction in light delivered that is caused by aging of the lamp. The luminaire dirt depreciation (LDD), also a number between 0 and 0.99, is a measure of the reduction of light by the buildup of dirt in the luminaire. The LDD is entered on the calculator keyboard 22 and is entered for calculation by depressing the LDD button 62. Examples are given for various luminaires and conditions in Tables 3 and 4. If either or both of the depreciation entries are not made, the associated depreciation value is treated as 0.99. These two parameters are the only ones that have non-zero default values. Calculations can thus be made using LL without depreciation or as a depreciated quantity (LL×LLD×LDD).

TABLE 3

Lamp Lumen Depreciation for Various Luminaires and Orientations

| Luminaire Type | Depreciation Factor LLD | |
|---|---|---|
| Standard Incandescent: | .87 | |
| A. PS, R, ER & PAR Lamps | | |
| Tungsten Halogen (Quartz) | .95 | |
| T. R. PAR & MR 16 Lamps | | |
| Mercury DX Lamps | | |
| Vertical Operation | .76 | — |
| Horizontal Operation | .71 | |
| Metal Halide Phosphor Coated | Vert. Oper. | Horiz. Oper. |
| 175 Watt | .71 | .61 |
| 250 Watt | .76 | .67 |
| 400 Watt | .69 | .66 |
| High Pressure Sodium | .9 | |
| All Wattages | | |

TABLE 4

Luminaire Dirt Depreciation LDD for Various Conditions

| Luminaire Type | Contaminant Classification | | | | |
|---|---|---|---|---|---|
| | Very Clean | Clean | Medium | Dirty | Very Dirty |
| Recessed Open | .97 | .85 | .62 | .53 | .45 |
| Recessed with Lens | .85 | .79 | .75 | .68 | .61 |

Having entered the data as described above, the operator next depresses the calculate (CAL) key 28. This directs determination of the number of fixtures, the area per fixture, and their spacing. When the CAL key 28 has been depressed and the calculation is complete, as evidenced by the display of a zero on the display 20, the operator may discover the required number of fixtures by depressing respectively the RCL, then the NUM button 68 to display the number; RCL, then the A button to display the area per fixture; and RCL and the SPG button 72 to display the spacing between adjacent fixtures. Any entered values can also be recalled to the display by depressing RCL and the appropriate key.

For repeated calculations with the same space and fixtures, the operator may change the desired or ones of FC, NUM, A and SPG and operate the calculate key 28 to determine the effect on the other parameters. A typical first step is to observe that the number of fixtures determined under a given set of assumptions is not an integer. Inserting a convenient integer by entering it on the calculator keyboard 22 and pressing the NUM button 68, then pressing the calculate key 28, will leave the room and lamp parameters unchanged while calculating new values of FC, A and SPG. If the first such calculations indicate that the lamp selected is not appropriate for the desired use, the calculator 18 retains the room dimensions, while different values of CU, LL and FC may be entered for the new calculation. This makes it easy for the lighting designer to try different spacings for the same lamp type and to try different lamp types for the same room.

The type of activity to be practiced in a room determines recommended lighting levels. For example, standards of the Illumination Engineering Society vary from a recommended minimum lighting level of thirty footcandles for casual lighting, through a minimum of 100 footcandles for medium demands, and up to 1000 footcandles for extra fine work. Once the dimensions of a space to be illuminated are given, it is useful to calculate the room cavity ratio (RCR) as defined in Table 1. This is typically a number between 1 and 10. When the RCR has been determined for a particular application, its use, combined with the specification of a particular fixture enables determination of the coefficient of utilization (CU). This is defined as the ratio of the number of lumens reaching a work plane to the number of lumens emitted from a particular lamp, and is frequently available as a tabulated value as part of the lamp specifications. The CU is modified by two multiplicative factors, the lamp lumen depreciation (LLD) and the luminaire dirt depreciation (LDD). The LLD is a measure of how much the emitted light is reduced by the luminaire or light fixture and its associated components and the LDD is a measure of the light loss resulting from dirt that accumulates on a fixture.

Given the information stated above, the selection and placement of light fixtures proceeds by determining the desired illumination level at a particular site. The site determines the room width, room length and height, which are used to calculate the RCR. The CU is determined most readily by looking up tabulated values, as in Table 3, which is a listing of values of the CU for various values of ceiling reflectance, wall reflectance and RCR for a particular recessed incandescent downlight. All values of the CU assume a floor cavity reflectance of 20 percent. Selection of the lamp also determines the lamp lumens (LL), a value that is specified for the luminaire, bulb type, and wattage rating.

The nominal number of foot candles (FC) is specified for particular applications by standards of the Illumination Engineering Society (IES). Selection of a nominal value of FC enables calculation of the number of lamp fittings (N), the area per fixture (A), and the Spacing of fixtures from each other (Spg). These calculations are made according to the formulas in Table 2.

The flow charts that follow represent modifications of the operating cycle of a standard four-function calculator that have been employed to provide a dedicated instrument to determine the selection of lighting fixtures using the parameters described above.

Figure 2:
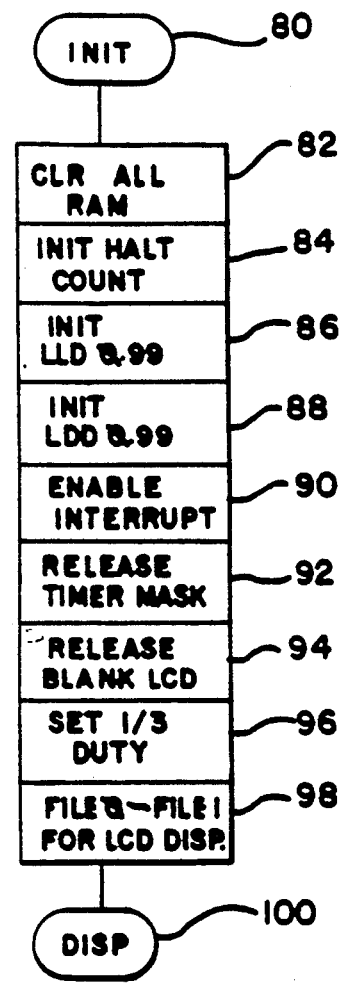
FIG. 2 is a flow chart of a power-up routine for the practice of the present invention.

FIG. 2 is an initialization routine. Entry block 80 is called by a operating the switch 32 of FIG. 1. A block 82 clears all RAMs and a block 84 initializes the halt count. A block 86 initializes the lamp lumen depreciation value at 0.99, and block 88 initializes the luminaire dirt depreciation at 0.99. These are the default values if no values of depreciation are entered in the calculator. A block 90 enables an interrupt and a block 92 releases a timer mask. A block 94 releases blanking of the display. A block 96 sets the duty, a block 98 initializes a segment selection for the display, and control exits to a display routine at an entry block 100. The calculator will display zero.

FIG. 3 is a flow chart of a display subroutine. FIG. 3 is entered at the entry block 100. A block 102 blanks the display, and a decision block 104 tests for an error flag. If there is an error flag, a block 106 clears a segment data file of information that would otherwise be displayed. A block 108 clears a key in the buffer, and a block 110 displays a zero and an error symbol. Control is then transferred to a scan subroutine at an entry block 112. Data in memory is maintained, but the display must be cleared to permit further calculation. If the decision block 104 finds no error flag, a block 114 sets a flag to check for a leading zero, and a block 116 initializes the digit count. A decision block 118 then tests for entry of a decimal point. This decision and the other operations of FIG. 3 are those of the display for the four-function calculator, without modification for the practice of the present invention. They will therefore be described generally. A loop 120 has two alternate paths from the decision block 118. If the decision block 118 does not find a decimal point, a loop 122 calls for the display of either a zero or the number an accumulator with a decimal point to the right. If the decimal point is detected, a block 124 displays the data in an accumulator with the decimal point in place. The loop 120 continues until a full count is detected by a decision block 126. A decision block 128 calls for the display of "M" if an item is stored in memory, a block 130 releases the blinking of the displays and control passes to an entry block 132. This is the entry to a scan routine.

FIGS. 4 and 5 together represent a flow chart of the scan routine. In FIG. 4, a decision block 140 tests for operation of the clear button. If the clear button is pressed, a block 142 saves a column value, a decision block 144 tests for the key-pressed flag, and control returns to the entry block 132 to repeat the scan. If the clear button is not pressed, a block 146 initializes a row value and a loop 148 fills rows and columns until the scan is over or key is pressed. If a key is pressed, a decision block 150 in the loop 148 transfers control to the block 142. If the scan is over, a decision block 152 transfers control to a decision block 154 which tests for a key-pressed flag. If there is none, control returns to the entry block 132. If the decision block 154 finds the key-pressed flag, a block 156 clears the flag and initializes before returning control to the entry block 132.

Entry to the decision block 144 occurs only when a key is pressed. If the key-pressed flag is not set, control passes to entry point 158 of FIG. 5. There, a block 160 sets flags and interrupts and a decision block 162 tests for an error flag. If there is one, a decision block 164 tests for a depression of the clear key. If the clear key is not depressed, control returns to the scan entry block 132, which is repeated here for convenience, and the scan routine displays an error message. If the decision block 164 finds the clear key depressed, a block 168 clears the flag and control is returned to the display entry point 158. If the decision block 162 finds no error flag, a decision block 168 tests for depression of the clear key. If the clear key is depressed, control returns through the block 166 to the display routine at display entry point 158. If the clear key is not depressed, a decision block 170 tests whether the key depressed is a function key or a data key. If it is a data key, control passes to the keyboard data entry point 172. If the key is a function key, control passes to the keyboard function entry 174.

FIG. 6 is a flow chart of the timer interrupt routine. This is a subroutine of the scan routine that is entered at an entry block 180. A block 182 saves a register value and increments a halt count. A decision block 184 tests whether the count is over. If it is not, a block 186 restores the register value and a return block 188 repeats the loop at the entry point 180. If the count is over, a block 190 clears the LCD segment data file and restores the register value before returning control to the scan entry block 132.

FIG. 7 is a flow chart of the keyboard data subroutine. In FIG. 7, a decision block 200 tests for operation of the decimal point key, the effect of which in the display is not evident until the entry of a number causes a left shift of the display including the decimal point. If the decision block 200 finds the decimal point key depressed, block 202 sets the decimal point to shift on the next entry, and control returns to the scan entry block 132. A decision block 204 tests for a zero key, a decision block 206 tests to see if the shift count is zero, and a decision block 208 tests for a flag indicating the depression of the decimal point key. A decision block 210 then tests to see if shift count is over. The effect of these decision blocks is to return control to the scan routine at the entry block 132 unless the shift count is not ended. This in affect leaves the display unchanged unless a non-zero number key is depressed as the left most entry or if any number key is depressed after a non-zero left most entry. If the shift count is not over, a block 212 increments the shift count by one and shifts the entered number in an accumulator. If the decimal point key has been depressed, setting a flag, a decision block 214 directs a block 216 to increment a counter before returning control to the display entry 100. If the flag is not set, control proceeds directly to the display entry point 100.

FIGS. 7, 8, 9, 10 and 11 together represent a connected flow chart of the operation as controlled by the keyboard function 174. In FIG. 8, a decision block 220 tests whether the MRC key is operated. If this key is operated once, it recalls memory; operated twice, it clears memory. If the MRC key is operated, control passes to a decision block 222, which tests to see if the MRC flag is set. If it is, control passes to a block 224 which clears the MRC flag, the memory buffer, and the f operator. The f operator determines whether the number entered on the keyboard is a first or a second operand. After the operation of the block 224, control passes to a block 226, which sets the first operand and returns control to the display 100.

If the decision block 22 indicates that the MRC flag is not set, control passes to a block 228, which sets the MRC flag and recalls memory. A decision block 230 then tests to see whether the f operator is clear. If it is, control passes to a block 226 as before. If the f operator is not clear, control passes to the block 232 to set the second operand following which control returns to the display 100. This completes the control sequence if the MRC key is operated.

If the decision block 200 indicates that the MRC key is not operated, control passes to a decision block 234 to test whether either the M+ or the M− key is operated. If either is, a decision block 236 tests to see whether the operand in position is the first or the second. If it is the first operand, control passes to the block 238. If it is not, control bypasses the block 238. In either case, a decision block 240 next tests to see whether the M+ key is operated. If it is, a block 242 directs placement of the positive value of the operand in memory. If the M+ key is not operated, this means that the M− key is operated, and a block 244 directs the placement of the negative value of the quantity memory. In either case, control passes to the box 246 which sets the first operand in memory, clears the f operator and returns to the display 100.

If none of the memory keys is operated, the decision block 234 directs control to a transfer site 248, which is common to FIGS. 8 and 9. Referring to FIG. 9, a decision block 250 tests for the presence of one of the arithmetic operators. If an arithmetic operator is detected, control passes to a decision block 252 which tests to see if the first or second operand is identified. If it is, a block 254 directs performance of the functional operation on the first and second operand and identifies the result as the first operand. Otherwise, the block 254 is bypassed. In either event, control passes to a block 256 where the selected operator is called and control passes to the display 100 to display the result.

If the decision block 250 does not identify the selection of an arithmetic operator, control passes to a decision block 260 which tests for operation of the equals key. If the equals key has not been selected, a decision block 262 next tests to see if the square-root key has been operated. If the square-root key is operated, a decision block 264 tests to see whether the data in the register is negative. If it is, a block 266 sets an error flag. This can be seen to call for an error display. If a negative entry is not detected, a decision block 268 tests for a zero value of data and diverts to the block 266 to indicate an error if the data value equals zero. This is an optional mode, since it is not necessary to flag the square root of zero as an error.

If the preceding test indicate a proper value of data, a block 270 calls for the application of a square-root routine to take the square root of the data. A block 272 next clears the function and the square-root value is taken as a first operand in the display.

The functional checks continue from the decision block 262 if the square-root key is not depressed. A decision block 276 tests for operation of the percent key. If the percent key is operated, a decision block 278 test to see whether a second operand has been entered. If it has not, a decision block 280 tests to see whether the clear operator has been operated. If it has not, control passes to the display 100 to display a zero, since the percent key will only operate on a second operand. If the clear operator has been operated, control passes to a block 282 to set the first operand and return to the display 100. If the percent key is operated and the decision block 278 finds a second operand, then a block 284 performs the percent function on the operands, the block 282 sets the result as the first operand, and that result is displayed. If the decision block 276 finds no percent key, then control passes by connector 286 to FIG. 10.

Figure 11:
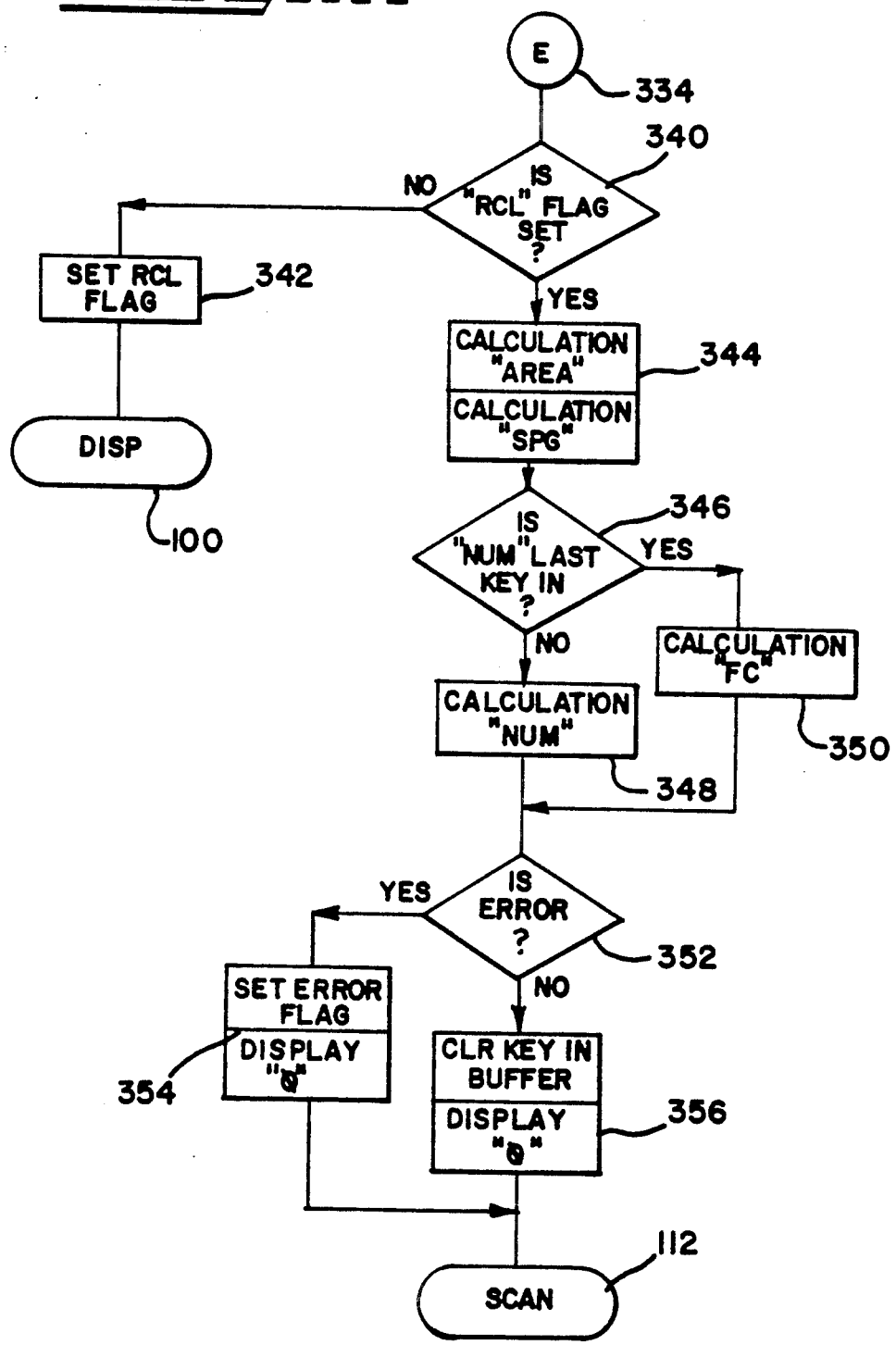
FIG. 11 is a continuation of the flow chart of FIG. 10.

The flow chart of FIGS. 10 and 11 represents the added operations that permit the modified four-function calculator to receive, hold and recall data entries for lighting calculations in addition to performing the normal functions of the calculator. Thus, in FIG. 10, a decision block tests to see if the RCR key is depressed. If it is, a block 290 calls for setting a sub cal flag and a calculate flag, and the calculation of the room cavity ratio RCR. Control then passes to the display 100, and the calculated RCR is displayed. If the RCR key is not operated, a decision block 292 tests to see whether the RW, RL, or H key is depressed. If it is not, a decision block 298 test to see whether the CU, LL, LLD or LDD key is depressed. If any of these keys is depressed, control passes to a block 294 to save a memory pointer and clear a calibration flag. Control then passes to a decision block 296 to test whether the RCL flag is set. The combination of the RCL key and one of the data entry keys recalls the stored data from memory and displays it without changing the data entry. Thus, if the recall flag is set, a block 300 clears a key-in buffer and restores memory data. If the decision block 296 indicates that the RCL flag is not set, this means that the displayed value is to be entered according to the key that is depressed. A decision block 302 first tests to see if the data is in range. If it is not, a block 304 sets an error flag. If the data is in range, a block 306 calls for a data to be saved.

The functions tested in the decision blocks 292 and 298 are functions that must be entered to enable a calculation. If a non-zero value is not entered for any of these functions, the calculator will produce an error message upon the attempt to make a calculation. The mechanism for doing this will be seen later. However, the quantities FC and NUM are two-way quantities. If a value is entered for FC, then NUM is calculated and vice versa. The quantities A and Spg are only calculated values. They cannot be entered. Thus, a decision block 308 tests for depression of one of the keys A, Spg, FC or NUM. If one of these keys is depressed, the decision block 310 tests for a recall flag. If the recall flag is not set, a decision block 312 tests for the calibration flag. If either the recall or the calibration flag is set, control passes to a block 314 to save a memory pointer. Control then passes through a tie point 316 to the block 300, the function of which has been described above.

If neither the recall nor the calibration flag is set, control passes to a decision block 318 which tests to see if either the FC or the NUM key is depressed. If neither is, a block 320 sets an error flag and control passes to a decision block 322. If FC or NUM contains an entry, a block 324 saves the memory pointer and the memory data and transfers control to the decision block 322. The decision block 322 tests to see if sub cal flag is set. If it is, a decision block 326 tests to see if an error flag is set. If it is, a block 328 clears the cali flag and the sub cal flag and transfers control to a block 330. If neither the SUB CAL flag nor the error flag is set, control passes directly to the block 330 to clear the recall flag. Control then passes to the display at the tie point 100 to display the called-for quantity, whether it is a keyboard entry, an entry recalled from memory, or an error signal.

The sequence of connected decision blocks 288, 292, 298 and 308 test for depression of all of the data-related keys involved in the entry of data, the recall of data or calculated results, or both. If none of these keys is depressed, control passes from the decision block 308 to the tie point 332, which is the entry into FIG. 11. Referring to FIG. 11, control passes first to a decision block 340, which tests to see if the recall flag is set. If it is not, a block 342 sets the recall flag and control returns to the display through the tie point 100. If the recall flag is set, a block 344 calls for calculation of area and spacing. A decision block 346 next tests to see if the number key was depressed more recently than the FC key. If it was not, a block 348 calls for calculation of the number of fixtures required. If the number key was depressed after an entry of a value for FC, then a block 350 calls for calculation of footcandles. These alternate paths allow for the determination of an approximate number of fixtures, followed by the substitution of an integral number of fixtures and a rapid recalculation of the lighting level produced by them.

After the calculation is made, a decision block 352 checks for the presence of an error. This will typically be either an entered value that is out of limits, including zero for the elements that do not have default values, or else a calculated value that exceeds the display range. If an error is detected, a block 354 sets the error flag and calls for the display of an error message. If no error is detected, a block 356 clears the key-in buffer and displays zero to indicate the end of a successful calculation. Control then returns to scan by the tie point 112.

The description of specific embodiments of the present invention is intended to set forth the best mode known to the inventor for the practice of the invention. It should be taken as illustrative and not as limiting, and the scope of the invention should be limited only by the appended claims.

What is claimed is:

1. An apparatus for selecting lighting fixtures to provide light at a predetermined value of footcandles FC from an array of predetermined fixtures, each characterized by a lamp lumen rating LL, in a space characterized by a length RL, a width RW and a height h, the apparatus comprising:

a) means for entering into a memory values corresponding to RL, RW, and h of the space, wherein said means for entering includes a plurality of input keys and one of said plurality of input keys is specifically associated with one of RL, RW or h;

b) means for determining a room cavity ratio (RCR) according to the pre-programmed formula $$RCR = \frac{5h \times (RL + RW)}{RL \times RW};$$

c) means for displaying the value of RCR as determined:

d) means for entering a coefficient of utilization CU, a value of lamp lumens LL and the predetermined value of footcandles FC into a memory;

e) means for calculating a number of fixtures NUM from the values in memory according to the pre-programmed formula $$NUM = \frac{FC \times RL \times RW}{LL \times CU};$$

f) means for storing the calculated value of NUM; and g) means for displaying the stored value of NUM, which displayed value of NUM is a calculated number of lamps to be installed at equal spacing in the space to provide the predetermined value of footcandles;

h) wherein said apparatus is hand-held for use by an operator on location.

2. The apparatus of claim 1 comprising in addition:

a) means for calculating an area per fixture A from the values in memory according to the formula $$A = \frac{LL \times CU}{FC};$$

and b) means for displaying A.

3. The apparatus of claim 2 comprising in addition means for calculating the spacing Spg between fixtures for the values in memory according to the formula $Spg = \sqrt{A}$.

4. The apparatus of claim 3 comprising in addition:

a) means for entering a value of lamp lumen depreciation LLD;

b) means for entering a value of lamp dirt depreciation LDD; and c) means for multiplying $LL \times LLD \times LDD$ to provide a depreciated value of LL in the means for calculating a number of fixtures NUM and in the means for calculating an area per fixture A.

5. A compact, portable apparatus dedicated for selecting lighting fixtures for a room, comprising:

(a) first means dedicated for receiving information regarding a length of the room;

(b) second means dedicated for receiving information regarding a width of the room;

(c) third means dedicated for receiving information regarding a height of the room;

(d) means for determining a room cavity ratio from the information obtained from said first, second and third receiving means;

(e) fourth means dedicated for receiving information relating to a coefficient of utilization for the fixture;

(f) a fifth means dedicated for receiving information relating to a lamp lumen rating for a lamp to be used in the fixture;

(g) sixth means dedicated for receiving information relating to the amount of footcandles required for the room;

(h) means for calculating a number of fixtures required for the room from said fourth, fifth and sixth receiving means;

(i) means for displaying the room cavity ratio and the number of fixtures required, and;

(j) wherein said first, second, third, fourth, fifth and sixth means are dedicated keys, which are a portion of a keyboard located on said portable apparatus.

* * * * *

UNITED STATES PATENT AND TRADEMARK OFFICE
CERTIFICATE OF CORRECTION

PATENT NO. : 5,027,307

DATED : June 25, 1991

INVENTOR(S) : Raymond J. Kusmer

It is certified that error appears in the above-indentified patent and that said Letters Patent is hereby corrected as shown below:

Column 3, line 65: insert

-- TABLE 2

Values of the Coefficient of Utilization (CU) for a particular lamp luminaire as a function of reflectances for various values of the Room Cavity Ratio (RCR). --

Column 4, line 56; delete ".87";

Column 4, line 57; after "PAR Lamps", in the Depreciation Factor LLD column, insert -- .87 --;

Column 4, line 58; delete ".95";

Column 4, line 59, inserting --.95-- after "PAR" & MR 16 Lamps" in the Dereciation Factor LLD column, instead of inserting after "DX Lamps".

Column 4, line 66; underline "High Pressure Sodium"; and delete ".9";

Column 4, line 67; after "Wattages", in the Vert. Oper. column, insert -- .9 --;

Column 5, line 3; insert "Luminaire Type" at left side of table;

UNITED STATES PATENT AND TRADEMARK OFFICE
CERTIFICATE OF CORRECTION

PATENT NO. : 5,027,307
DATED : June 25, 1991
INVENTOR(S) : Raymond J. Kusmer

It is certified that error appears in the above—identified patent and that said Letters Patent is hereby corrected as shown below:

Column 5, line 4; delete "Luminaire Type";

Column 5, line 4; insert "Very" in far right column of the table;

Column 5, line 5; delete "Dirty" from far left side of table;

Column 5, line 5; insert -- Dirty -- in far right column of the table under "Very" in line 4.

Column 11, line 6; delete ":" and insert -- ; --.

In addition, the certificates to be issued, will include: Column 5, line 5, delete "Very" from far right column of the table;

Signed and Sealed this

Twenty-ninth Day of June, 1993

Attest:

MICHAEL K. KIRK

Attesting Officer

Acting Commissioner of Patents and Trademarks